United States Patent [19]
Giansante

[11] 3,810,327
[45] May 14, 1974

[54] ATMOSPHERE CONTROL SYSTEM FOR GROWING MUSHROOMS AND THE LIKE

[76] Inventor: Joseph A. Giansante, 720 Willow St., Pottstown, Pa. 19464

[22] Filed: Dec. 29, 1972

[21] Appl. No.: 319,229

[52] U.S. Cl............................ 47/1.1, 47/17, 165/21
[51] Int. Cl............................................. A01q 1/04
[58] Field of Search.................. 165/6, 7, 21, 96, 22; 47/1.1, 17

[56] References Cited
UNITED STATES PATENTS

| | | | |
|---|---|---|---|
| 3,717,953 | 2/1973 | Kuhn et al. | 47/1.1 |
| 3,042,383 | 7/1962 | Pennington | 165/7 |
| 3,698,472 | 10/1972 | Gold et al. | 165/6 |
| 3,398,481 | 8/1968 | Lake | 47/17 |
| 3,613,308 | 10/1971 | Klein et al. | 47/17 |

*Primary Examiner*—Manuel A. Antonakes

[57] ABSTRACT

System for controlling the environment in a mushroom growing room including three novel and unique sub-systems, namely (1) a carbon dioxide concentration sensing device and control means responsive thereto for controlling the proportions of recirculated air and fresh air continuously introduced into the mushroom growing room so as to maintain the carbon dioxide level therein at 0.1 percent or less, and for doing so separately in a plurality of such rooms; (2) a proportionally controlled heat exchanger in which exhaust air from one or more mushroom growing rooms or chambers is heat exchanged with incoming fresh air for ventilation of such chambers using a heat transfer member, such as a large metal wheel with a relatively large amount of surface area, which is rotated at a speed proportional to the temperature difference between the fresh air after passing through the exchanger and a pre-selected desired temperature; and (3) a temperature-humidity control system which maintains optimum conditions in a growing room continuously with a high level of accuracy.

22 Claims, 8 Drawing Figures

ATMOSPHERE CONTROL SYSTEM FOR GROWING MUSHROOMS AND THE LIKE

This invention relates to systems for growing mushrooms and, more particularly, to a mechanical system for maintaining certain pre-selected ideal conditions in a mushroom growing environment.

This invention finds use in the forced growing of commercially cultivated mushrooms, especially of the species Agricus Bisporus.

A related invention, of common inventorship and assignment, is disclosed and claimed in another application filed concurrently herewith.

Prior art commercial methods of raising mushrooms involve closed buildings with ventilation controlled primarily by manual means based on the experience of an individual, such as a master grower. While such master growers may take into account various process factors such as the completion of various growing phases as observed by them, control of insects and pests, off-odors, etc., these master growers have generally not been able to automate their functions or to systematize their analysis and response. There has, in fact, been relatively little mechanization or automation in the mushroom growing industry, and it is only rather recently that the industry has been able to produce commercially as many as two crops per year. Certain recent publications have disclosed some of the environmental parameters and other factors of importance to commercial mushroom growing. One such publication is Progress Report No. 302, dated Mar. 1970, by Wuest, Schisle and Schroede of the Agricultural Experiment Station at University Park, Pa. The title of that report is "A Unitized Forced Air Ventilation System for Mushroom Growing."

With this background, it is the general objective of the present invention to facilitate the forced growing of mushrooms by providing apparatus wherein the environment for the growing thereof, is maintained in accordance with certain pre-selected ideal standards to expedite their growth and to enhance the quality of mushrooms grown thereby.

It is another object of this invention to provide apparatus wherein mushroom growth is expedited and mushroom quality enhanced so as to permit the commercial harvesting of several high quality crops per year.

These objects and others, which will be apparent in the course of the subsequent discussion of this invention, are met by a system including means for continuously sensing the carbon dioxide contact in each mushroom growing chamber and in response to an indication that the $CO_2$ content therein exceeds 0.1 percent causing a proportional decrease in the amount of recirculated gas introduced to the chamber, and a proportional increase in the amount of fresh air introduced into the chamber along with the recirculated gas. Thus, the recirculating gaseous environment of the chamber is continuously diluted with fresh air to maintain a $CO_2$ content of 0.1 percent or less.

It should generally be recognized that carbon dioxide is produced in greatest quantities in the early stages of mushroom growth and this production declines as the crop ages. It is evident, therefore, that automatic maintenance of a maximum $CO_2$ content will contribute greatly to an improved mushroom growing system, of which the present invention is one component.

The system of this invention also includes a heat recovery system wherein incoming fresh air is heat exchanged with the exhaust air which it replaces in the ventilation supply means and the rate of heat exchange therein is effectively controlled, as necessary, to provide thermally treated fresh air at a pre-selected desired temperature. In the preferred form of the present invention, a massive rotating member with high heat capacity and heat transfer characteristics, such as two large metallic wheels co-axially mounted with a plurality of spokes, is rotated at a controlled speed through two adjacent chambers through which are passed, respectively, the fresh air to be heated or cooled, and the exhaust air to be vented to the atmosphere.

Further, this system includes individual ventilation air return and supply sub-systems for each separate mushroom growing chamber, each such sub-system having large capacity fans for exchanging the total air volume in the chamber at frequent intervals, sensors for sensing and indicating the temperature and relative humidity in the air withdrawn from the chamber, comparing these values to pre-selected desired values and, in response thereto, controlling heating, cooling, and humidifying means adapted to thus treat ventilation air as, or just before, it is delivered or supplied to the chamber.

The specific means adapted to carry out these functions will be described in more detail hereinafter.

For a better understanding of the present invention, reference is made to the following detailed discussion and appended claims, taken in conjunction with the drawings, wherein:

Figure 1:
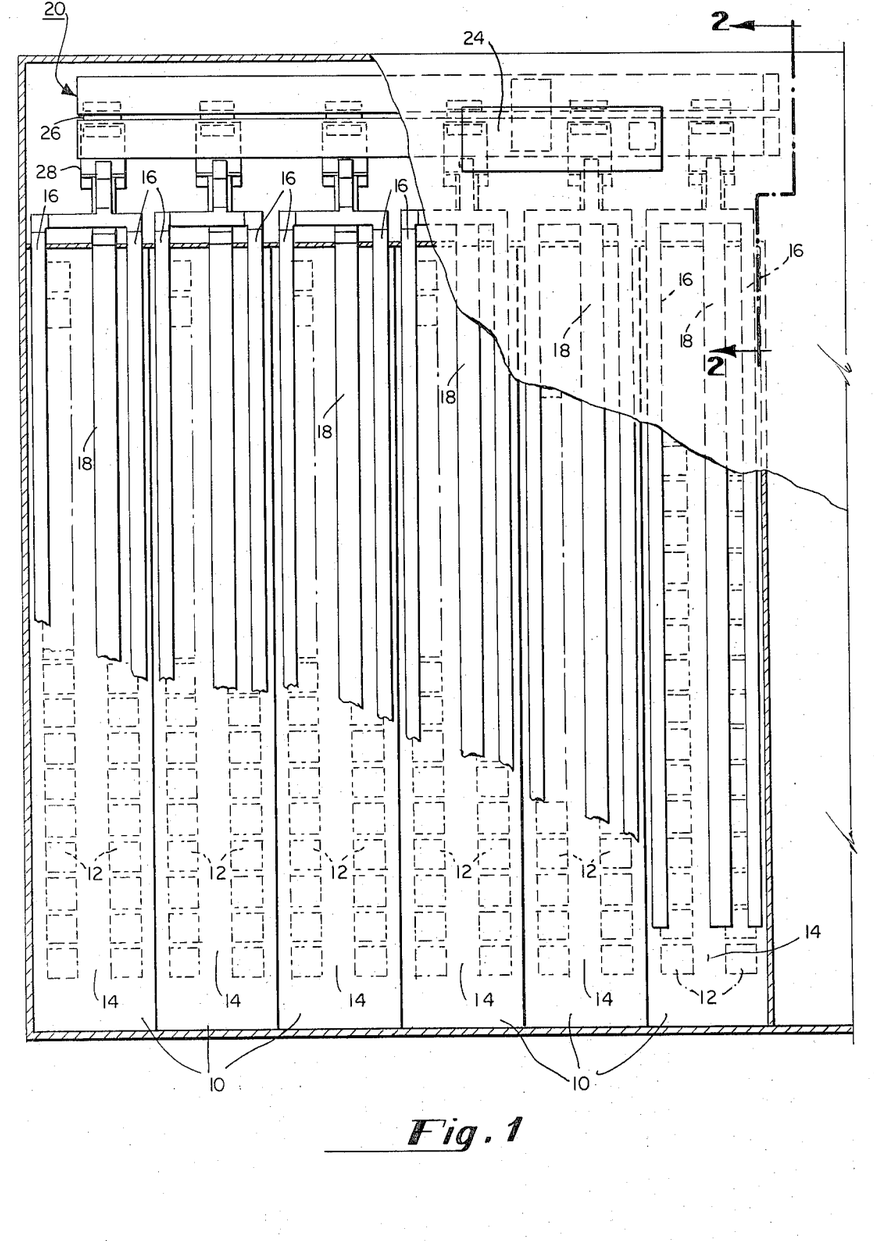
FIG. 1 is a plan view, partially in section, of a multi-section, multi-level mushroom growing building showing details of the upper mushroom growing chambers in each section thereof.

Referring more specifically to FIG. 1, there are shown six upper chambers 10, each adapted to receive and store therein a plurality of mushroom growing trays 12, usually about 2.4 meters square. Growing trays 12 are disposed on either side of an aisle 14. Disposed above growing trays 12 and aisle 14 are ventilation supply ducts 16 and ventilation return ducts 18. A ventilation supply and recirculation system 20 for each chamber is disposed at one end thereof.

Figure 2:
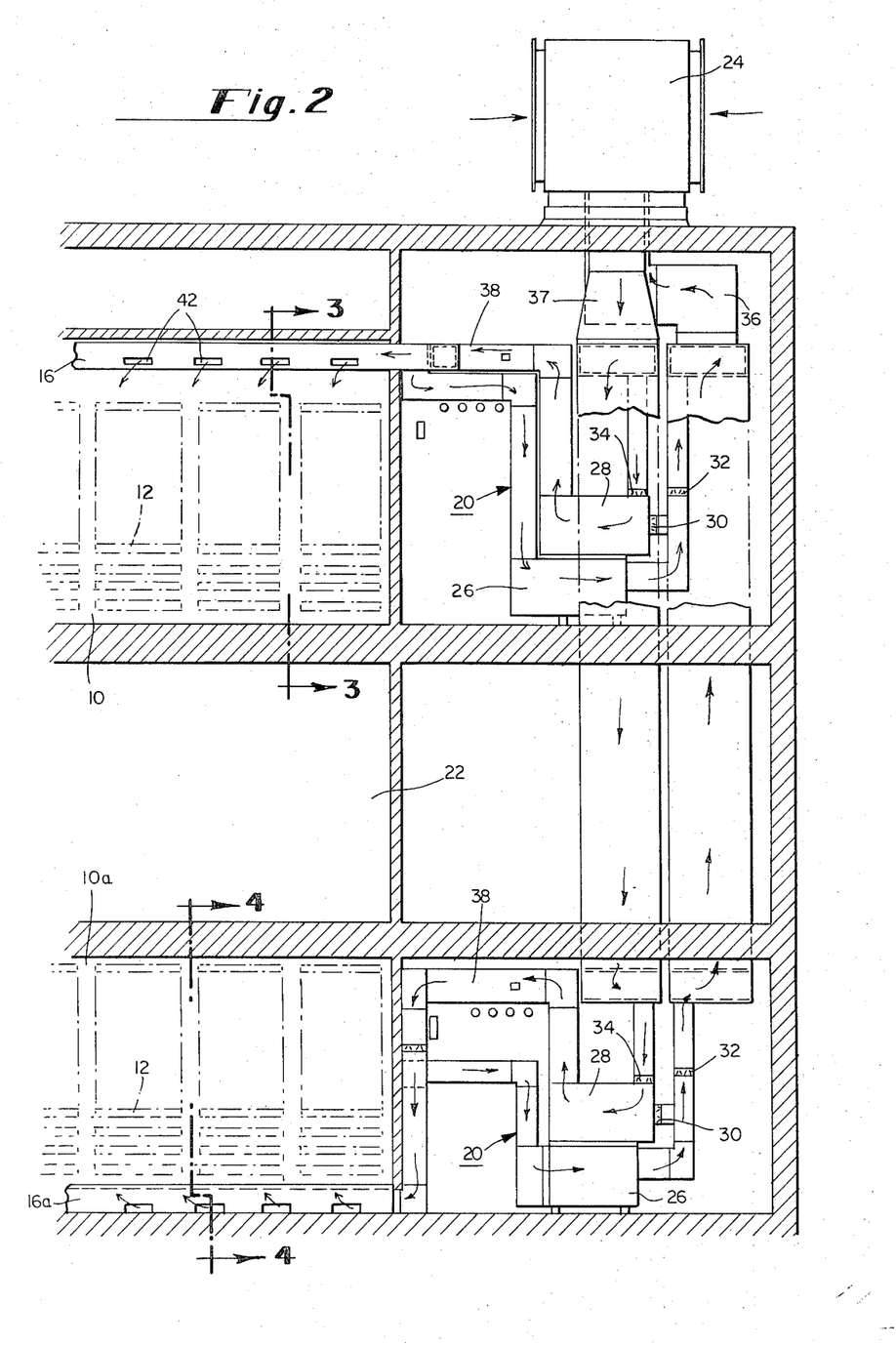
FIG. 2 is a partial elevation view, in section, of the mushroom growing building showing in FIG. 1 in the plane 2—2.

As seen in FIG. 2, another series of chambers, sometimes referred to as lower chambers 10a, are located on a lower level of the building housing upper chambers 10 with an access and servicing level 22 interposed between upper chambers 10 and lower chambers 10a. Lower chambers 10a also include means for receiving and storing a plurality of growing trays 12 and ventilation supply and return ducts 16a and 18a. However, it will be noted that ventilation supply and return ducts 16a and 18a in lower chambers 10a are disposed below growing trays 12, for reasons explained more fully hereinafter.

A ventilation intake thermal treatment unit housing 24 housed on the roof of the structure enclosing chambers 10 and 10a, supplies fresh air at a pre-selected temperature, usually about 54°F. in winter weather and 69°F. in summer weather, to ventilation supply and recirculation systems 20 for each of the chambers 10 and 10a through ventilation inlet ducts 37 of each of the respective chambers 10 and 10a. Exhaust fans disposed in housing 26 and recirculating air fans disposed in housing 28 provide the necessary energy for movement of the ventilation air in each of the chambers 10 and 10a. Automatically controllable dampers 30, 32, and 34, separately control, for each chamber 10 or 10a, the proportion of exhaust air vented to the atmosphere through exhaust ducts 36 and return through the recirculation fan disposed in housing 28 to be mixed therein with fresh air admitted by damper 34 and returned through ventilation supply duct manifolds 38 to ventilation supply ducts 16 and 16a.

Figure 3:
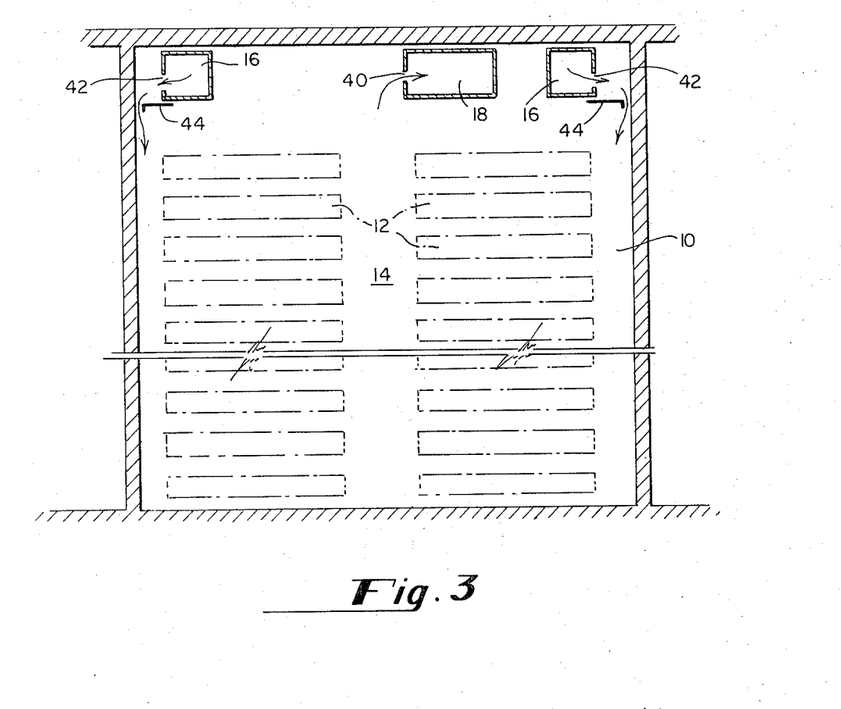
FIGS. 3 and 4 are section views of the individual mushroom growing chambers shown in FIG. 2, in the planes 3—3 and 4—4.
Figure 4:
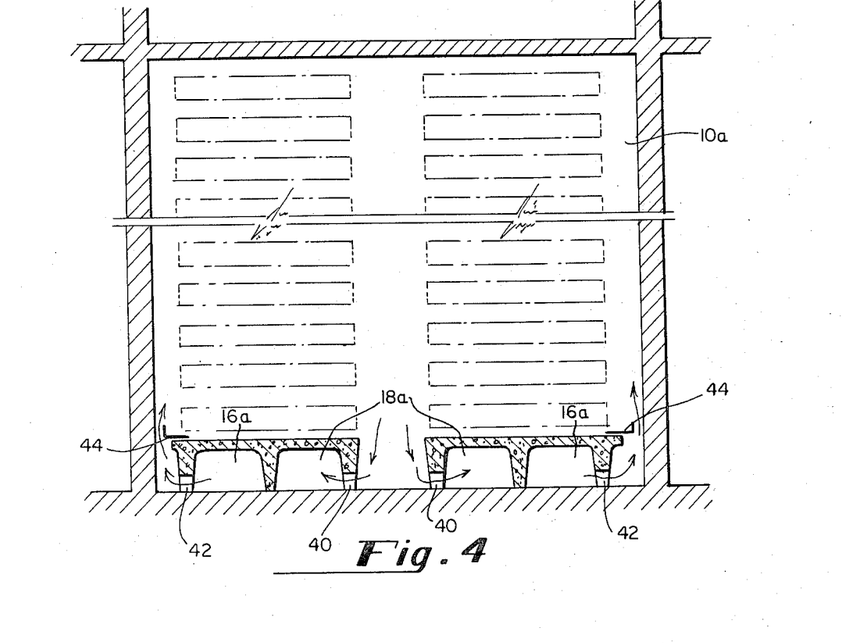

As better seen in FIGS. 3 and 4, ventilation supply ducts 16a and ventilation return ducts 18a in lower chambers 10a generally comprise preformed concrete ducts disposed along the floor of chambers 10a.

To be particularly noted is the specific means provided to distribute the incoming ventilation gases as evenly as possible throughout the cross-section of chambers 10 and 10a while minimizing drafts and localized high velocity air passage over any of the growing trays. This result is obtained, first of all, by locating ventilation supply ducts and ventilation return ducts 16, 16a, and 18, 18a, respectively, (as best seen in FIG. 2) at the top of upper chambers 10 and the bottom of lower chambers 10a, and along both longitudinal walls of each of the chambers 10 and 10a (as best seen in FIGS. 3 and 4). Drafts, which are harmful in mushroom production, are avoided by the horizontal disposition of the inlets 40 and outlets 42 of the ventilation supply system. Moreover, the outlets 42, assisted by deflectors 44 (distributed along the length of chambers 10 and 10a as seen in FIG. 2), cause the incoming ventilation supply air to be evenly distributed along the outer walls of chambers 10 and 10a for optimum ventilation air distribution and minimum stream or draft flow over the growing mushrooms. Similarly, ventilation return inlets 40 are disposed near the center of chambers 10 and 10a in order to encourage the continuous flushing of the entire cross-section of chambers 10 and 10a by the ventilation supply air flowing from the upper or lower surface, as the case may be, to the opposite surface and then back to the original horizontal surface on which the respective ventilation supply systems are disposed.

Loading and unloading of trays 12 in chambers 10 and 10a from access and servicing level 22 is facilitated by the location of ducts 16 and 18 on the ceiling of chambers 10 and of ducts 16a and 18a on the floor of chambers 10a.

Figure 5:
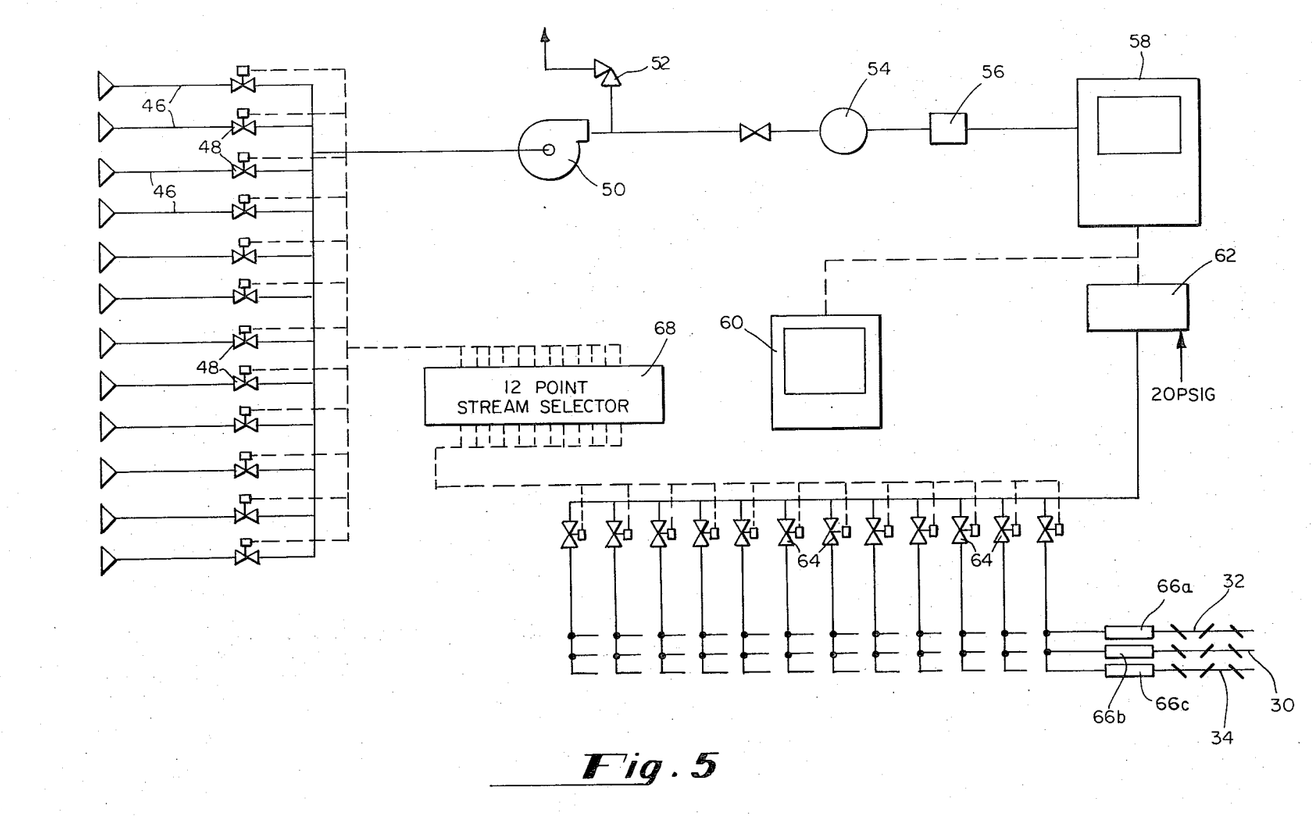
FIG. 5 is a schematic layout of the carbon dioxide sensitive atmosphere control system, used in the mushroom growing chambers shown in FIGS. 1–4, in accordance with the present invention.

In the schematic layout of FIG. 5, there is shown the system for controlling the carbon dioxide (hereinafter $CO_2$) concentration level in the chambers 10 and 10a, in accordance with the present invention. More specifically, sampler tubes 46 communicate through sampling valves 48 with vacuum pump 50, having relief valve 52 on the positive pressure side thereof, and otherwise communicating through gas flow control 54 and guard filter 56 with $CO_2$ analyzer 58, typically yielding a 4-20 milliamp dc signal in response to a 0-0.2 weight percent $CO_2$ level measured by infrared spectrum analysis in analyzer 58. Analyzer 58 may also provide a visual indication of $CO_2$ content for manual control of this system, and may also provide a permanent record of $CO_2$ level, such as by a strip chart recorder 60.

In the automatic control mode, the output of analyzer 58 converted to a pneumatic signal in signal converter 62 controls pneumatically operated valves 64 and dampers 30, 32, and 34 through damper operators 66a, 66b, and 66c (shown for one typical signal output line only) disposed in the ventilation supply and recirculation system 20 for each of the chambers 10 and 10a. Stream selectors 68 interconnected to the respective sampling valves 48 and pneumatically operated valves 64 controlling damper operators 66a–c are provided to ensure that damper operators 66a –c are actuated for a particular chamber 10 or 10a in response to a signal indicating a $CO_2$ content exceeding 0.1 percent in a sample taken from that particular chamber. Thus, $CO_2$ level is monitored and controlled independently for each chamber with a single $CO_2$ sensor.

As indicated above, generally it is desired to control the $CO_2$ content in the mushroom growing environment to a maximum of 0.1 weight percent. In response to an indication by analyzer 58 of a $CO_2$ level above 0.1 percent in any chamber, valve 64 and damper operators 66a–c are actuated for that particular chamber to open normally closed damper 32, to open normally closed damper 34 and to close normally open damper 30, all of the respective openings and closings being proportional to one another and to the amount by which the signal indicates the 0.1 percent level has been exceeded, so that the amount of recirculating air diverted to exhaust ducts 36 from the recirculating fan in housing 26, in the chamber in question, is compensated for in the recirculated air passing through the recirculating fan in housing 28 by the admission of an equivalent amount of fresh air from inlet duct 37, up to the maximum respective openings and closings, at which point, in the preferred form of the present invention, approximately 60 percent of the air returned from the growing chamber would be exhausted and replaced in the system with fresh air. Reverse movement of each of the respective dampers is effected upon indication by analyzer 58 of a $CO_2$ level of 0.1 weight percent or less in any given chamber. At that concentration level, dampers 32 and 34 revert to their normally closed position and damper 30 reverts to its normally open position to effect total recirculation of chamber atmosphere.

With the introduction of fresh air into the recirculating ventilation gases, it is necessary to thermally condition the incoming fresh air to maintain the thermal balance in the system. Preferably, this is accomplished by a heat recovery system 70 in housing unit 24 peculiarly adapted to the present system.

Figure 6:
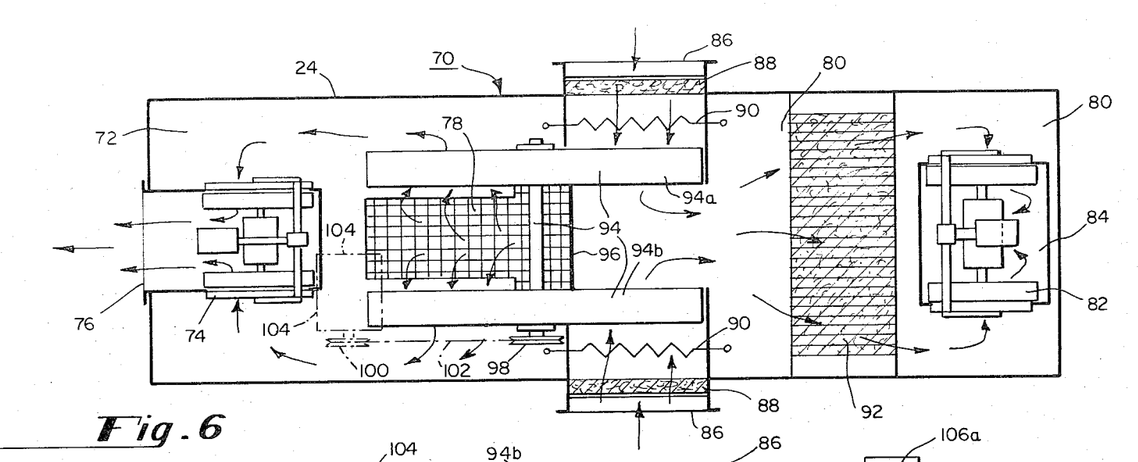
FIGS. 6 and 7 are plan and side section views, respectively, of a unique heat exchanger particularly adapted to the improved mushroom growing apparatus described and claimed herein.
Figure 7:
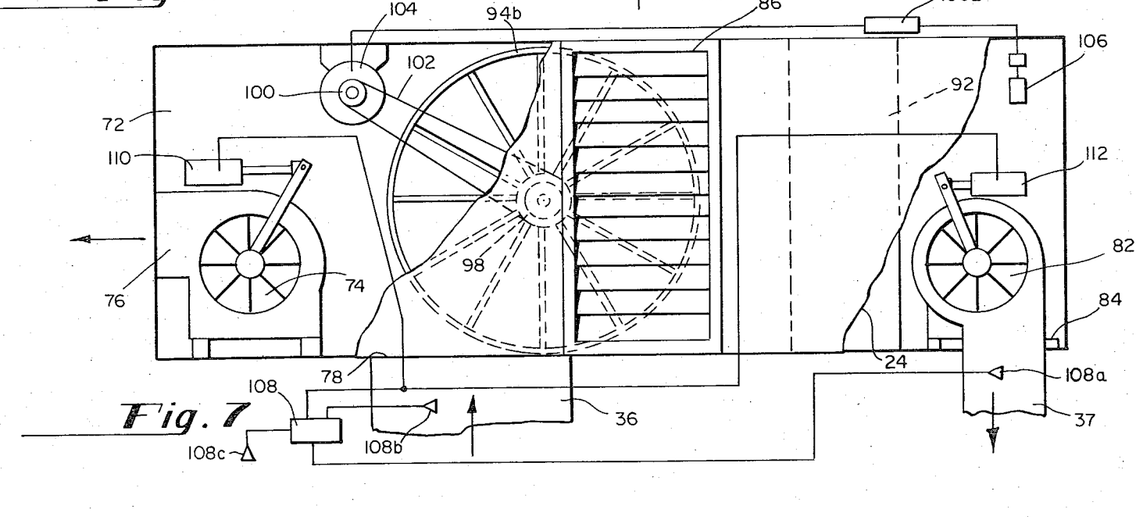

This system, as shown in more detail in FIGS. 6 and 7, consists of an exhaust air chamber 72 housing an exhaust fan 74 having an outlet 76 to the atmosphere and an inlet 78 (to system 70) communicating with exhaust ducts 36 of the ventilation supply and recirculation systems 20 of each of the chambers 10 and 10a. Adjacent to exhaust air chamber 72 is incoming fresh air chamber 80, having a fresh air supply fan 82 and communicating through discharge outlet 84 (of system 70) with ducts 37 of ventilation supply and recirculation systems 20 for each of the chambers 10 and 10a. Also communicating with incoming fresh air chamber 80 are fresh air inlets 86, further including first stage filters 88 and electric resistance heating elements 90. Fresh air entering at inlet 86 passes through secondary filters 92 before entering fresh air supply fan 82. When ambient air temperature falls below 32°F., heating elements 90 are actuated to heat it to that temperature.

A heat transfer member 94, having a relatively high surface area and relatively high heat transfer and heat capacity constants passes through an opening in wall 96 separating exhaust air chamber 72 and incoming fresh air chamber 80, continuously moving from one of said chambers to the other of said chambers and back.

Preferably, heat transfer member 94 consists of two massive metal wheels 94a and 94b and numerous spokes. Wheels 94a and 94b are rotated, under the influence of pulleys 98 and 100 connected by belt 102 and driven by motor 104 at a speed controlled by temperature thermostat 106 and SCR controller 106a located in chamber 80, having an output signal, either electrical or pneumatic, proportional to the difference between the temperature sensed by thermostat 106 and a pre-set temperature. In the preferred form of the present invention, this pre-set temperature is 54°F.

Static pressure sensing tips 108a-c located in the ventilation supply air duct 37 (108a) and in the exhaust duct 36 (108b), in conjunction with a sensing tip to atmosphere (108c) provide a differential pressure signal to a differential static pressure regulator 108 that in response to system static pressure changes will provide a variable control signal to Vortex damper operators 110 and 112 that will operate proportionally to maintain the pre-set static pressure on the static pressure regulator 108 and in the ducts 36 and 37. In this manner, the annular electric power consumption of fans 74 and 82 are substantially reduced and limited only to that necessary to move the amount of air called for by systems 20.

In order to maintain a heat balance in the ventilation and supply systems 20 of this invention, make up or fresh air is either heated or cooled, preferably to about 54°F by heat recovery system 70, using exhaust air, which is generally very close to 62°F., as a heat sink or heat source as may be required. If outside air temperature is below 32°F., the air is pre-heated by elements 90 to 32°F. This control, as pointed out above is effected by temperature thermostat 106, which controls the speed of heat exchanger wheel 94 through SCR controller 106a. As the difference between the temperature of the air leaving fan 82 and 54°F. increases, the speed, and therefore the effective heat exchange rate of member 94, also increases. The overall tendency of heat transfer member 94 then is to equalize the temperatures of the gases passing through the two chambers of heat recovery system 70. If the incoming fresh air is significantly cooler than the exhaust air, heat will be recovered from the exhaust air to raise the temperature of the incoming air. Similarly, when the ambient air temperature significantly exceeds the exhaust air temperature, it is cooled by heat exchange with the exhaust air.

In addition to the carbon dioxide concentration sensing and control system and the heat recovery system, both described in detail above, another important aspect of the present invention is the temperature and humidity control system. This system maintains a heat and humidity balance which provides optimum conditions for mushroom growing throughout the year.

Mushroom growth proceeds in stages at which different amounts of heat are given off by the mushrooms. This plus the variability in temperature and humidity of ambient air which must be introduced from time to time makes it very difficult to maintain optimum temperature and humidity conditions in the growing chambers.

In the present invention, a system is provided (for the first time to applicant's knowledge) to maintain these conditions, generally from 57° to 60°F. (dry bulb) and 90–95 percent relative humidity, very nearly constant.

Important features of this system include the supply or ventilation air and return air ducts, previously described, including the duct outlets and inlets and the associated air deflectors; also included are high capacity supply (or ventilation) air and recirculating fans and return or exhaust air fans, all designed to exchange the entire air volume in each growing chamber (without creating drafts in the chambers) in a short period of time, preferably on the order of 1 to 2 minutes.

Figure 8:
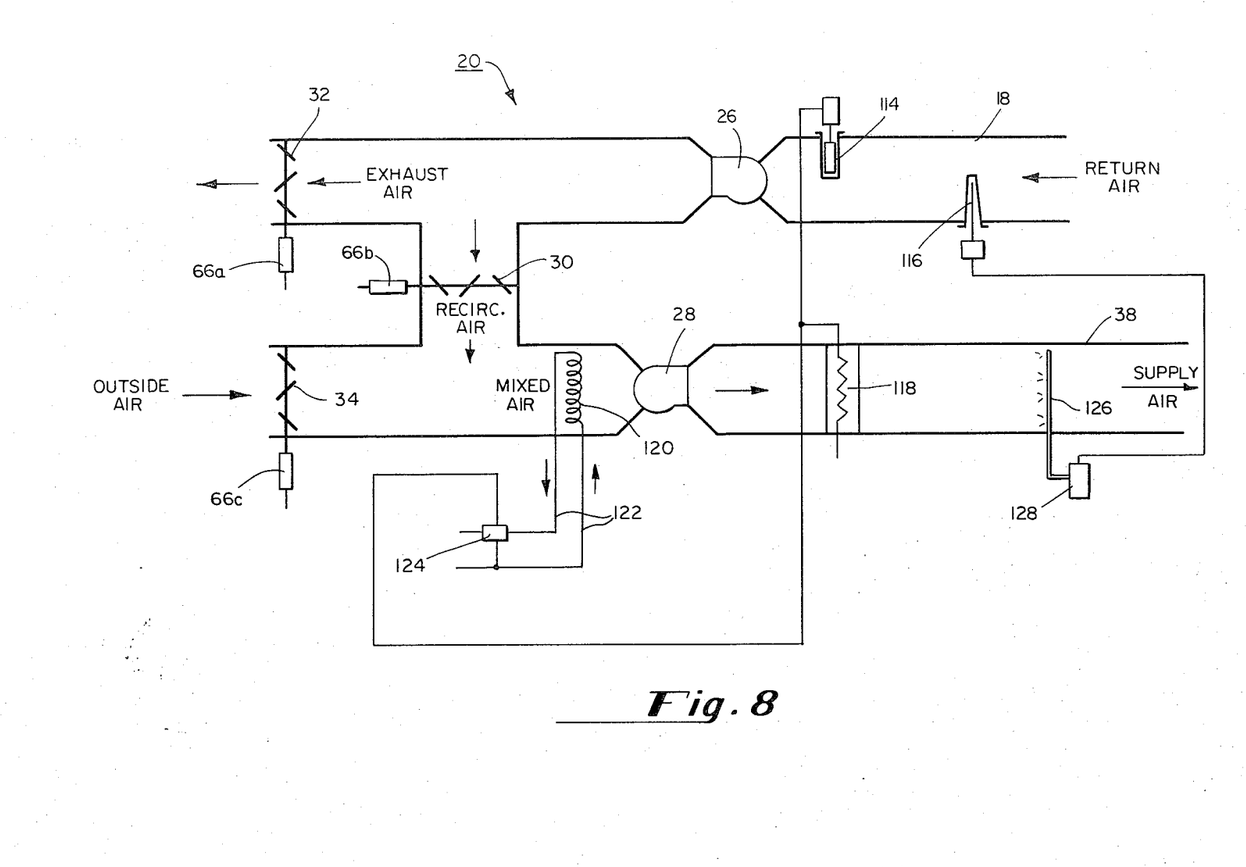
FIG. 8 is a schematic layout of the temperature-humidity control system of the present invention.

With the air in each chamber thus being exchanged on the order of every 1½ minutes (as in the preferred embodiment of the present invention) and with part of the return air regularly or intermittently being withdrawn in favor of thermally conditioned ambient air to maintain a predetermined $CO_2$ level, the present system for temperature and humidity control in the chambers, as schematically illustrated in FIG. 8, necessarily requires a variety of sensors and conditioning means, each located in specific parts of the system.

Referring more specifically to FIG. 8, there is shown a typical ventilation and supply system 20, for one of the chambers 10, including, as previously described, ventilation return duct 18, exhaust fan (not shown) located in housing 26, recirculating air fan (not shown) located in housing 28, recirculating air damper 30, exhaust air damper 32 and fresh or make-up air damper 34, and ventilation supply duct manifold 38, each controlled by damper operators 66a, 66b, 66c, respectively.

Located in ventilation return duct 18 are temperature sensor and control means 114 and humidity sensor and control means 116. A heater, such as an electric resistance heater 118, located just downstream of the supply air fan, and a cooler such as chilled water coil 120 with chilled water supply and return lines 122 and chilled water valve 124 located just upstream of the supply air fan, are controlled by temperature sensor and control means 114 to heat or cool, as necessary, ventilator air supplied to manifold 38 to maintain the temperature of return air in duct 18 at a pre-selected temperature, preferably about 62°F. Similarly, a humidifier, such as steam inlet means 126 communicating with a source of steam, not shown, at or near its saturation point, through steam valve 128, is controlled by humidity sensor and control means 116, to aid humidity as necessary to supply air in manifold 38 in order to maintain the relative humidity of return air in duct 18 at or near 95 percent.

Thus, essentially constant and optimum growing conditions are maintained in chambers 10 and 10a, using common $CO_2$ analyzing means and fresh air supply, thermal conditioning and heat recovery means for all of the chambers and essentially independent temperature, humidity, and $CO_2$ level control systems for each of the respective chambers 10 and 10a.

While this invention has been described with respect to the preferred embodiment thereof, this invention should not be considered as limited thereto. Rather, it will be apparent to those skilled in the art that numerous other embodiments, with variations and modifications as would be obvious to those skilled in the art, may be devised without departing from the true spirit and scope of this invention.

I claim:

1. In a closed mushroom growing chamber including means for storing a plurality of mushroom growing trays under controlled environmental conditions, the improvement comprising a ventilation system including a. means for continuously withdrawing air from said chamber,
   b. means for measuring the concentration of carbon dioxide in said chamber and comparing said concentration to a preselected desired concentration,
   c. means for transmitting an output signal proportional to the amount by which said carbon dioxide concentration exceeds said pre-selected desired concentration,
   d. means responsive to said output signal for separating a portion of said air withdrawn from said chamber and exhausting said separated portion from the system and for adding to the air withdrawn from said chamber, after said portion has been separated, a quantity of fresh air, the quantity of said fresh air added and of the portion of withdrawn air separated being calculated to reduce said carbon dioxide concentration in said chamber to said pre-selected desired concentration, and
   e. means for continuously supplying to said chamber said withdrawn air remaining after said portion has been removed therefrom and said quantity of fresh air has been added thereto.

2. An improved mushroom growing chamber, as recited in claim 1, wherein said continuous withdrawal means includes (i) a first outlet duct with a first damper and automatically controlled damper operator, said first duct communicating with the ambient atmosphere and (ii) a second outlet duct with a second damper and automatically controlled damper operator, and said continuous introducing means includes an inlet duct with a third damper and automatically controlled damper operator, said inlet duct communicating with the ambient atmosphere, said second damper being proportionally closed and said first and third dampers being proportionally opened in response to said signal, said first and third damper and said second damper being normally closed and said second damper being normally opened when said signal indicates said carbon dioxide concentration not to exceed said pre-selected desired concentration, said outlet duct communicating with said inlet duct downstream of said second damper.

3. An improved mushroom growing chamber, as recited in claim 2, wherein said continuous air withdrawing means and said continuous air supplying means consist of fans communicating, respectively, with ventilation return ducts and ventilation supply ducts in said chamber, said fans being of sufficiently high capacity to replace the total volume of air in said chamber in a time interval of from 1 to 5 minutes.

4. An improved mushroom growing chamber, as recited in claim 3, wherein said air withdrawing means includes temperature sensing means and relative humidity sensing means and said air supplying means includes air heating, cooling, and humidifying means, said heating, cooling, and humidifying including automatic control means responsive to differences between the temperature and relative humidity indicated by said sensing means and pre-selected desired temperature and humidity levels.

5. An improved mushroom growing chamber, as recited in claim 4, wherein said heating means consists of a resistance heater located downstream of said ventilation air supply fan, said cooling means consists of a chilled water coil located just upstream of said ventilation air supply fan, and said humidifying means consists of steam inlets disposed downstream of said heating means.

6. An improved mushroom growing chamber, as recited in claim 5, wherein said pre-selected desired temperature and humidity levels are 62°F. and 95 percent relative humidity respectively.

7. An improved mushroom growing system including a plurality of improved mushroom growing chambers as recited in claim 4, wherein each such chamber is one of several elongated chambers, half of which are disposed on an upper level and half of which are disposed on a lower level of a common housing, each of said chambers providing means for storing said mushroom growing trays in stacks along the elongated side-walls of said chamber with an access aisle therebetween, said ventilation return ducts being disposed generally along said aisle and said ventilation supply ducts being disposed generally along both elongated side-walls of each said chamber.

8. An improved mushroom growing system, as recited in claim 7, wherein said supply and return ducts are disposed along the ceiling of said upper chambers and along the floor of said lower chambers.

9. An improved mushroom growing system, as recited in claim 8, wherein said supply and return ducts include a plurality of inlet and outlet openings distributed along the length of said elongated chambers, said inlet and outlets of said supply and return ducts being horizontally directed.

10. An improved mushroom growing system, as recited in claim 9, wherein said outlet openings of said supply ducts are directed toward the respective side-walls of said chambers along which said supply ducts are disposed and a deflector is disposed between said outlet openings and the remainder of said chamber to direct air from said outlet opening into a sheet flow along said sidewall.

11. An improved mushroom growing system including a plurality of improved mushroom growing chambers as recited in claim 1, wherein fresh air is supplied to all of said ventilation systems from a controlled rate heat exchange unit and exhaust air from all of said ventilation systems is exhausted to said heated exchange unit, said unit consisting of:

a. two adjacent compartments, one of said compartments having an inlet for receiving said exhaust air from said ventilation systems and an outlet to the ambient atmosphere and the second of said compartments having an inlet from the ambient atmosphere and an outlet communicating with the supply side of said ventilation systems, b. a heat transfer member having relatively large surface area and high heat capacity and heat transfer constants, and adapted to continuously move from one of said compartments to the other of said compartments and back, said member being adapted to transfer heat between the air in the respective compartments and thereby to tend to equilibrate the temperature of said air, and c. means to cause said heat transfer member to move between said chambers at a rate proportional to the difference between a pre-selected temperature and the temperature of fresh air received by said heat exchange unit.

12. An improved mushroom growing system, as recited in claim 11, wherein said heat transfer member comprises at least one metallic wheel with a plurality of spokes mounted and adapted to rotate with parts thereof in both of said compartments at all times.

13. An improved mushroom growing system, as recited in claim 12, further including a sensor for sensing the temperature of air in said second compartment, comparing it to a preselected desired temperature and producing an output signal proportional to the difference between said temperatures and means responsive to said signal for controlling the speed of rotation of said wheel in proportion to said temperature difference.

14. An improved mushroom growing system, as recited in claim 13, wherein heating means is provided in the inlet of said second compartment to raise the temperature of incoming ambient air which is below 32° to 32°F.

15. An improved mushroom growing system including a plurality of improved mushroom growing chambers, as recited in claim 4, where fresh air is supplied to all of said ventilation systems from a controlled rate heat exchange unit and exhaust air from all of said ventilation systems is exhausted to said heated exchange unit, said unit consisting of:

a. two adjacent compartments, one of said compartments having an inlet for receiving said exhaust air from said ventilation systems and an outlet to the ambient atmosphere and the second of said compartments having an inlet from the ambient atmosphere and an outlet communicating with the supply side of said ventilation systems, b. a heat transfer member having relatively large surface area and high heat capacity and heat transfer constants, and adapted to continuously move from one of said compartments to the other of said compartments and back, said member being adapted to transfer heat between the air in the respective compartments and thereby to tend to equilibrate the temperature of said air, and c. means to cause said heat transfer member to move between said chambers at a rate proportional to the difference between a pre-selected temperature and the temperature of fresh air received by said heat exchange unit.

16. An improved mushroom growing system, as recited in claim 15, wherein said heat transfer member comprises at least one metallic wheel with a plurality of spokes mounted and adapted to rotate with parts thereof in both of said compartments at all times.

17. An improved mushroom growing system, as recited in claim 16, further including a sensor for sensing the temperature of air in said outlet of said second compartment, comparing it to a pre-selected desired temperature and producing an output signal proportional to the difference between said temperatures and means responsive to said signal for controlling the speed of rotation of said wheel in proportion to said temperature difference.

18. An improved mushroom growing system, as recited in claim 17, wherein heating means is provided in the inlet of said second compartment to raise the temperature of incoming ambient air which is below 32° to 32°F.

19. In a mushroom growing system including a closed temperature-controlled atmosphere environment and a ventilation system therefor wherein fresh air at ambient temperature is introduced into the system and an equivalent amount of air from the closed atmosphere environment is exhausted to the ambient atmosphere, the improvement consisting of a controlled rate heat exchanger to thermally treat the incoming fresh air so that its temperature approaches that of said exhaust air, said heat exchanger consisting of a. two adjacent compartments, one of said compartments having an inlet for receiving said exhaust air from said ventilation system and an outlet to the ambient atmosphere and the second of said compartments having an inlet from the ambient atmosphere and an outlet communicating with the supply side of said ventilation system, b. a heat transfer member having relatively large surface area and high heat capacity and heat transfer constants, and adapted to continuously move from one of said compartments to the other of said compartments and back, said member being adapted to transfer heat between the air in the respective compartments and thereby to tend to equilibrate the temperature of said air and c. means to cause said heat transfer member to move between said chambers at a rate proportional to the difference between a preselected temperature and the temperature of fresh air received by said heat exchange unit.

20. An improved mushroom growing system, as recited in claim 19, wherein said heat transfer member comprises at least one metallic wheel with a plurality of spokes mounted and adapted to rotate with parts thereof in both of said compartments at all times.

21. An improved mushroom growing system, as recited in claim 20, further including a sensor for sensing the temperature of air in said outlet of said second compartment, comparing it to a pre-selected desired temperature and producing an output signal proportional to the difference between said temperatures and means responsive to said signal for controlling the speed of rotation of said wheel in proportion to said temperature difference.

22. An improved mushroom growing system, as recited in claim 21, wherein heating means is provided in the inlet of said second compartment to raise the temperature of incoming ambient air which is below 32° to 32°F.

* * * * *